United States Patent [19]
White

[11] Patent Number: 5,179,686
[45] Date of Patent: Jan. 12, 1993

[54] METHOD FOR AUTOMATICALLY DETECTING THE SIZE OF A MEMORY BY PERFORMING A MEMORY WARP OPERATION

[75] Inventor: Daniel F. White, Lawrenceville, Ga.

[73] Assignee: NCR Corporation, Dayton, Ohio

[21] Appl. No.: 568,572

[22] Filed: Aug. 16, 1990

[51] Int. Cl.⁵ .................. G06F 12/02; G06F 13/00
[52] U.S. Cl. ............................. 395/425; 395/800; 395/400; 364/DIG. 1; 364/245; 364/245.31
[58] Field of Search .................. 395/400, 425, 800

[56] References Cited
U.S. PATENT DOCUMENTS

| | | | |
|---|---|---|---|
| 3,898,631 | 8/1975 | Brown et al. | 340/173 R |
| 4,562,532 | 12/1985 | Nishizawa et al. | 364/200 |
| 4,571,676 | 2/1986 | Mantellina et al. | 364/200 |

FOREIGN PATENT DOCUMENTS 0271028  6/1988  European Pat. Off.
2228112  8/1990  United Kingdom.

*Primary Examiner*—Thomas C. Lee
*Assistant Examiner*—L. Donaghue
*Attorney, Agent, or Firm*—Richard W. Lavin

[57] ABSTRACT

A method for detecting the size of a DRAM memory includes the steps of establishing a table of memory bank configurations each having a different memory capacity, selecting one of the memory configuration, writing and reading a data word at the lowest address in the bank having the highest memory capacity, writing a data word at an address higher than the lowest address, reading the data word at the lowest address and storing the selected memory configuration in a storage register as the memory configuration of the memory when the data word read at the lowest address was not the word written at the highest address.

5 Claims, 11 Drawing Sheets

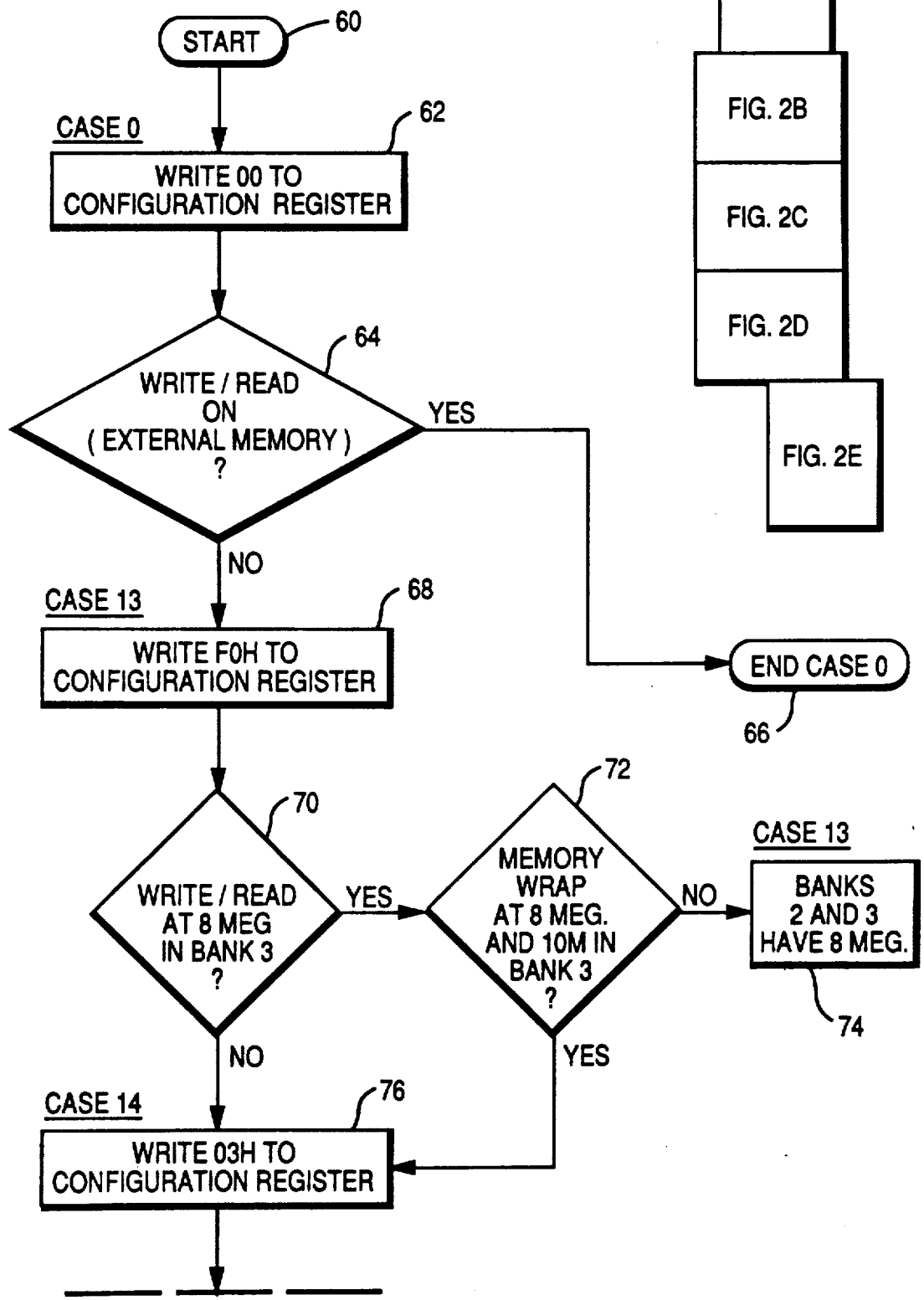

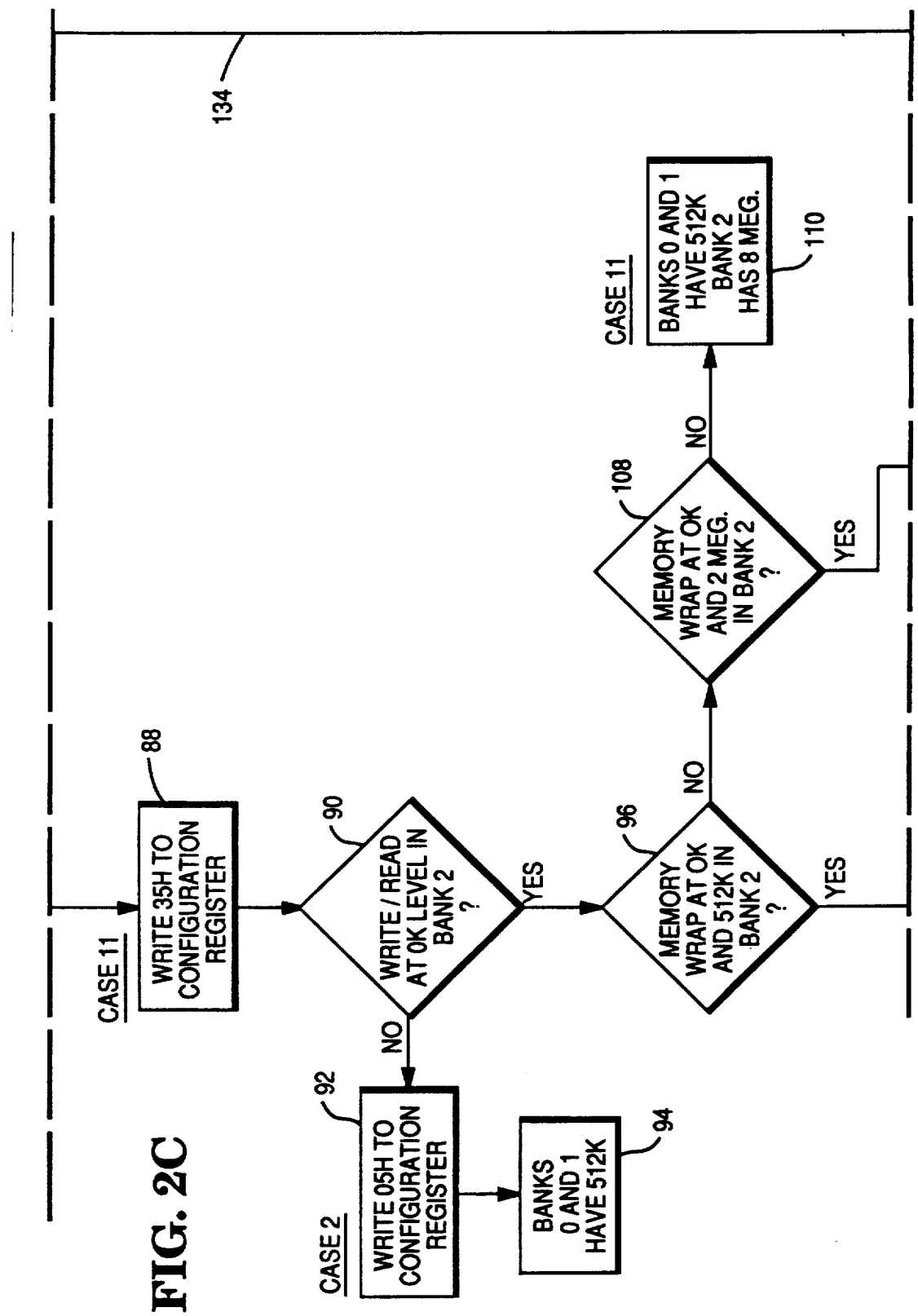

TABLE 1

| CASE NO. | MEMORY CONFIGURATION | BANK STORAGE | CONFIGURATION BITS USED 1-0 | 3-2 | 5-4 | 7-6 |
|---|---|---|---|---|---|---|
| 0) | 00H | NO MEMORY | NONE, NO SIGNAL ACTIVE | | | |
| 1) | 01H | BANK 0  512K | 0 1 | X X | 0 X | X X |
| 2) | 05H | BANK 0 AND 1  512K | 0 1 | X 1 | 0 X | X X |
| 3) | 15H | BANK 0,1 AND 2  512K | 0 1 | X X | 0 1 | X X |
| 4) | 55H | ALL BANKS  512K | 0 1 | X X | 0 X | X 1 |
| 5) | 25H | BANK 0 AND 1  512K<br>BANK 2  2M | 0 X | X X | 1 0 | 0 X |
| 6) | A5H | BANK 0 AND 1  512K<br>BANK 2 AND 3  2M | 0 X | X X | 1 0 | 1 X |
| 7) | 02H | BANK 0  2M | 1 0 | X X | X 0 | X X |
| 8) | 0AH | BANK 0 AND 1  2M | 1 0 | 1 X | X 0 | X X |
| 9) | 2AH | BANK 0,1 AND 2  2M | 1 0 | X X | 1 0 | X X |
| 10) | AAH | ALL BANKS  2M | 1 0 | X X | X 0 | 1 X |
| 11) | 35H | BANK 0 AND 1  512K<br>BANK 2  8M | 0 X | X X | 1 1 | X X |
| 12) | 3AH | BANK 0 AND 1  2M<br>BANK 2  8M | 1 0 | X X | X 1 | 0 X |
| 13) | F0H | BANK 2 AND 3  8M | X X | X X | 1 1 | 1 1 |
| 14) | 03H | BANK 0  8M | 1 1 | X X | X X | 0 X |
| 15) | 0FH | BANK 0 AND 1  8M | 1 1 | 1 X | X X | X X |

TABLE 2

TOTAL MEMORY FOR CASE NUMBER

| CASE NO. | SIZE | BANK 0 | BANK 1 | BANK 2 | BANK 3 |
|---|---|---|---|---|---|
| 0) | NONE | | | | |
| 1) | 512K | 00000 | | | |
| 2) | 1M | 00000 | 00001 | | |
| 3) | 1.5M | 00000 | 00001 | 00010 | |
| 4) | 2M | 00000 | 00001 | 00010 | 00011 |
| 5) | 3M | 00100 | 00101 | 000XX | |
| 6) | 5M | 01000 | 01001 | 000XX | 001XX |
| 7) | 2M | 000XX | | | |
| 8) | 4M | 000XX | 001XX | | |
| 9) | 6M | 000XX | 001XX | 010XX | |
| 10) | 8M | 000XX | 001XX | 010XX | 011XX |
| 11) | 9M | 10000 | 10001 | 0XXXX | |
| 12) | 12M | 100XX | 101XX | 0XXXX | |
| 13) | 16M | | | 0XXXX | 1XXXX |
| 14) | 8M | 0XXXX | | | |
| 15) | 16M | 0XXXX | 1XXXX | | |

ADDRESS DECODE BITS 23 22 21 20 19

FIG. 6A

CASE 0

NO MEMORY

CASE 1

| BANK 0 | 512K |

CASE 2

| BANK 1 | 1M |
| BANK 0 | 512K |

CASE 3

| BANK 2 | 1.5M |
| BANK 1 | 1M |
| BANK 0 | 512K |

CASE 4

| BANK 3 | 2M |
| BANK 2 | 1.5M |
| BANK 1 | 1M |
| BANK 0 | 512K |

CASE 5

| BANK 1 | 3M |
| BANK 0 | 2.5M |
| BANK 2 | 2M |

CASE 6

| BANK 1 | 5M |
| BANK 0 | 4.5M |
| BANK 3 | 4M |
| BANK 2 | 2M |

CASE 7

| BANK 0 | 2M |

CASE 8

| BANK 1 | 4M |
| BANK 0 | 2M |

METHOD FOR AUTOMATICALLY DETECTING THE SIZE OF A MEMORY BY PERFORMING A MEMORY WARP OPERATION

BACKGROUND OF THE INVENTION

The present invention relates to computer memory systems and more specifically to a computer memory system in which the amount of storage in the memory system can be changed.

In modern day computer systems, memory systems associated with the computer system have usually been made up of several individual memory modules. In the present embodiment, each module could be built which could contain up to sixteen megabytes of storage in segments of varying size storage capacities. Such modules could be added to the computer system at various times to change the total memory capacity of the system. When this occurs, the system must be made aware of such changes in order to function properly. Such a memory system would have a plug board in which an array of memory modules would be plugged. So that the data processing system may properly allocate the amount of storage it has available, it has been the practice to provide some indication to the processing system as to how much available storage is contained in the memory unit. This is generally done by having a terminal board containing terminals that can be jumped or wired in different ways to give an indication as to the amount of storage in the memory system. In most cases, the end user has had to be an engineer to decipher the cryptic code needed for this set-up. This situation has led to many misadjusted memory boards which took time to correct resulting in delays in the operation of the computer system.

SUMMARY OF THE INVENTION

There is provided, in accordance with the present invention an apparatus which includes a central processing unit and a memory unit having variable memory capacities, a method for detecting the size of the memory unit comprising the steps of storing data representing a plurality of memory units each with different storage capacities in a first storage unit, selecting from the first storage unit a first memory unit as the size of the memory unit, writing a first binary word at the lowest address in the memory unit, performing a first read operation at the lowest address in the memory unit, writing a second binary word at an address which is higher than the lowest address in response to reading the first binary word at the lowest address in the memory unit, performing a second read operation at the lowest address in the memory unit, and storing in a second storage unit data representing the first memory unit as representing the memory capacity of the memory unit when the second binary word is read by the second read operation.

It is therefore a principal object of this invention to provide a system for automatically detecting the amount of memory in a computer system upon the occurrence of the operation of the computer system.

It is a further object of this invention to provide a method and apparatus for automatically detecting the size of available memory contained in a computer system in the minimum amount of time.

BRIEF DESCRIPTION OF THE DRAWINGS

These and other objects, features and advantages of the invention, as well as the invention itself, will become more apparent to those skilled in the art in light of the following detailed description taken into consideration with the accompanying drawings wherein like reference numerals indicate like or corresponding parts throughout the several views and wherein:

FIGS. 2A-2E inclusive disclose a flowchart of the program for automatically sizing the memory modules in the computer system;

FIG. 3 is a diagram illustrating how FIGS. 2A-2E inclusive are arranged;

FIG. 4 is a diagrammatic representation of a truth table representing the logical operation of the memory decode unit 32 of FIG.1;

FIG. 5 is a diagrammatic representation of a truth table representing the logical operation of the bank select unit 36 of FIG. 1; and FIGS. 6A-6C inclusive are diagrammatic representations of the configuration of the memory banks located in the computer system associated with each of the Case Nos. disclosed in the truth table of FIG. 4.

DESCRIPTION OF THE PREFERRED EMBODIMENT

Figure 1:
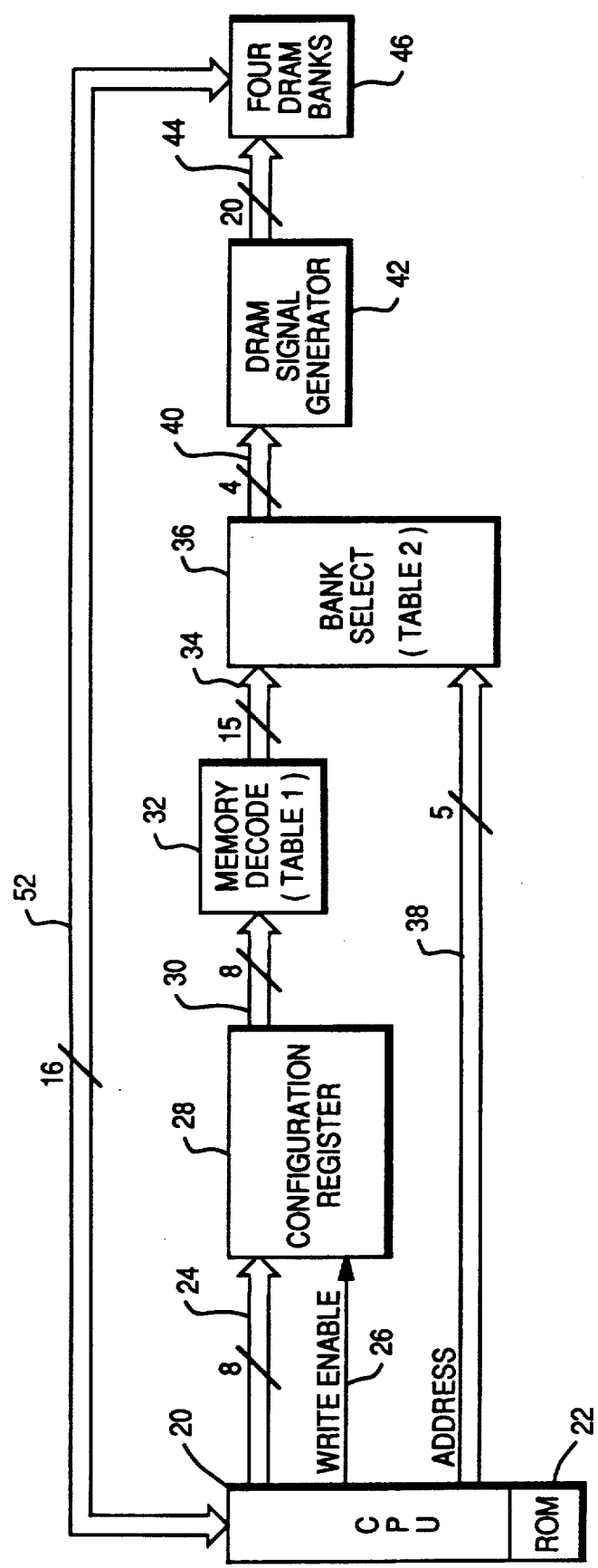
FIG. 1 is a block diagram of the apparatus for detecting the size of the memory modules in the computer system.
Figure 2B:
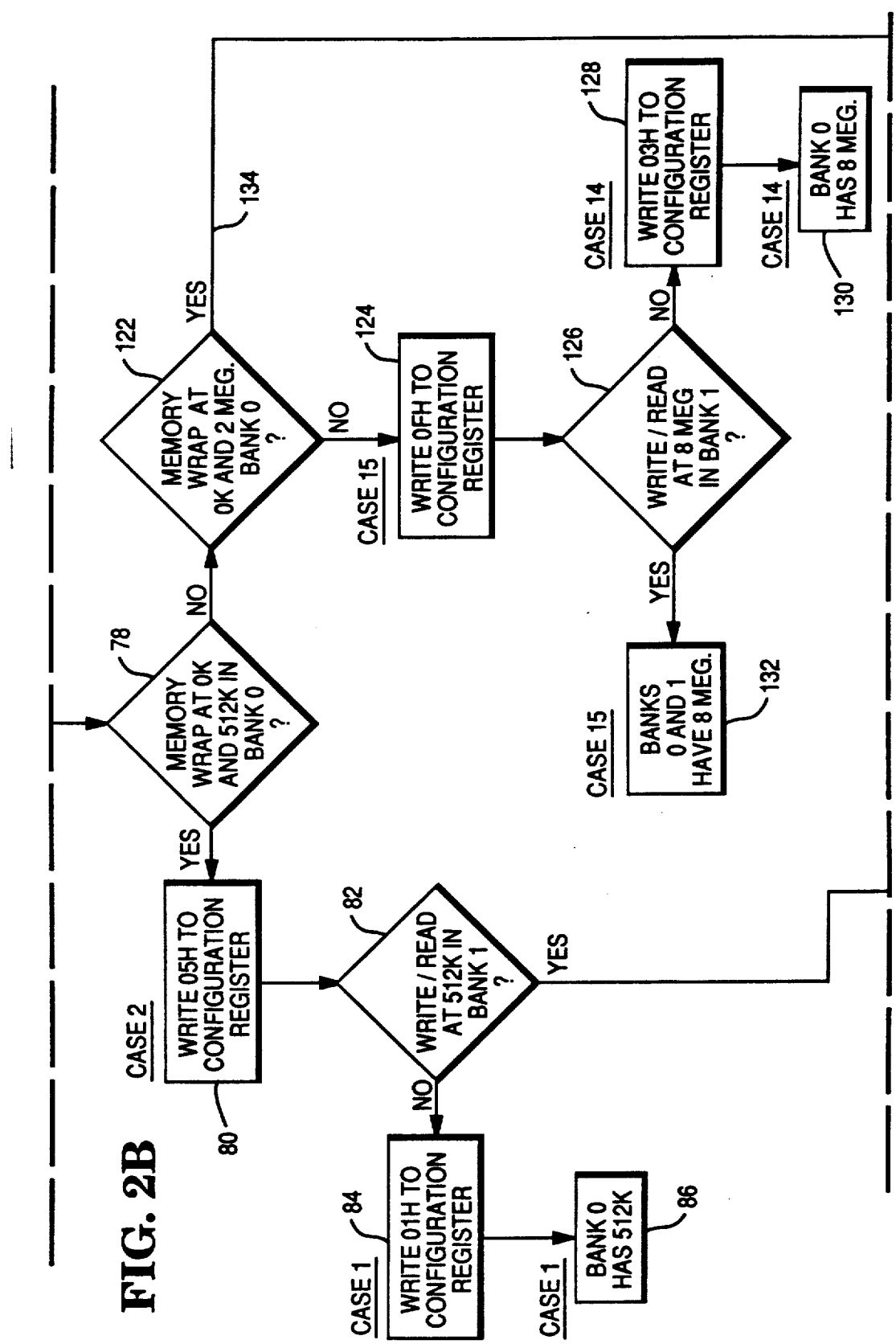
Figure 2D:
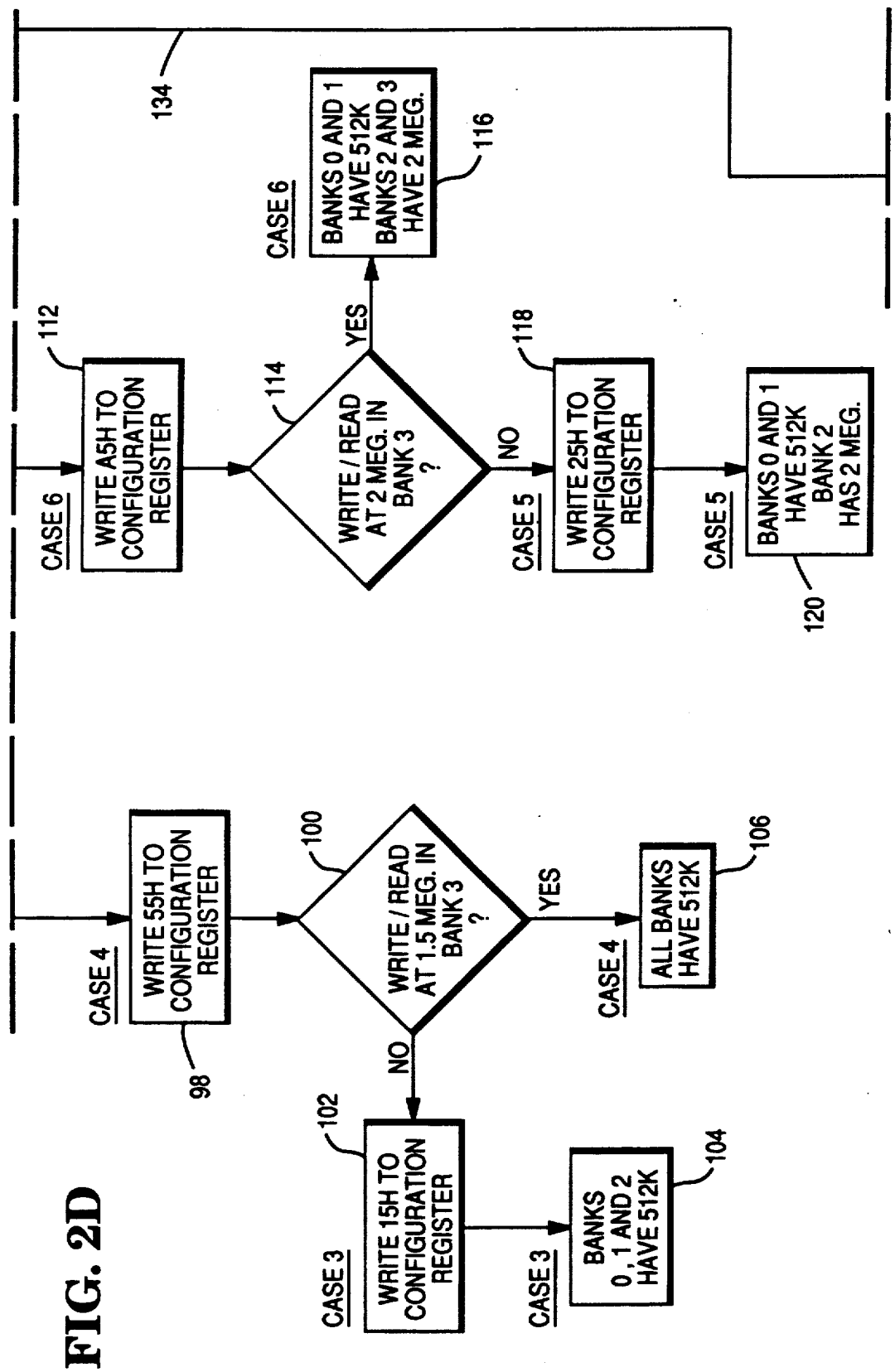
Figure 2E:
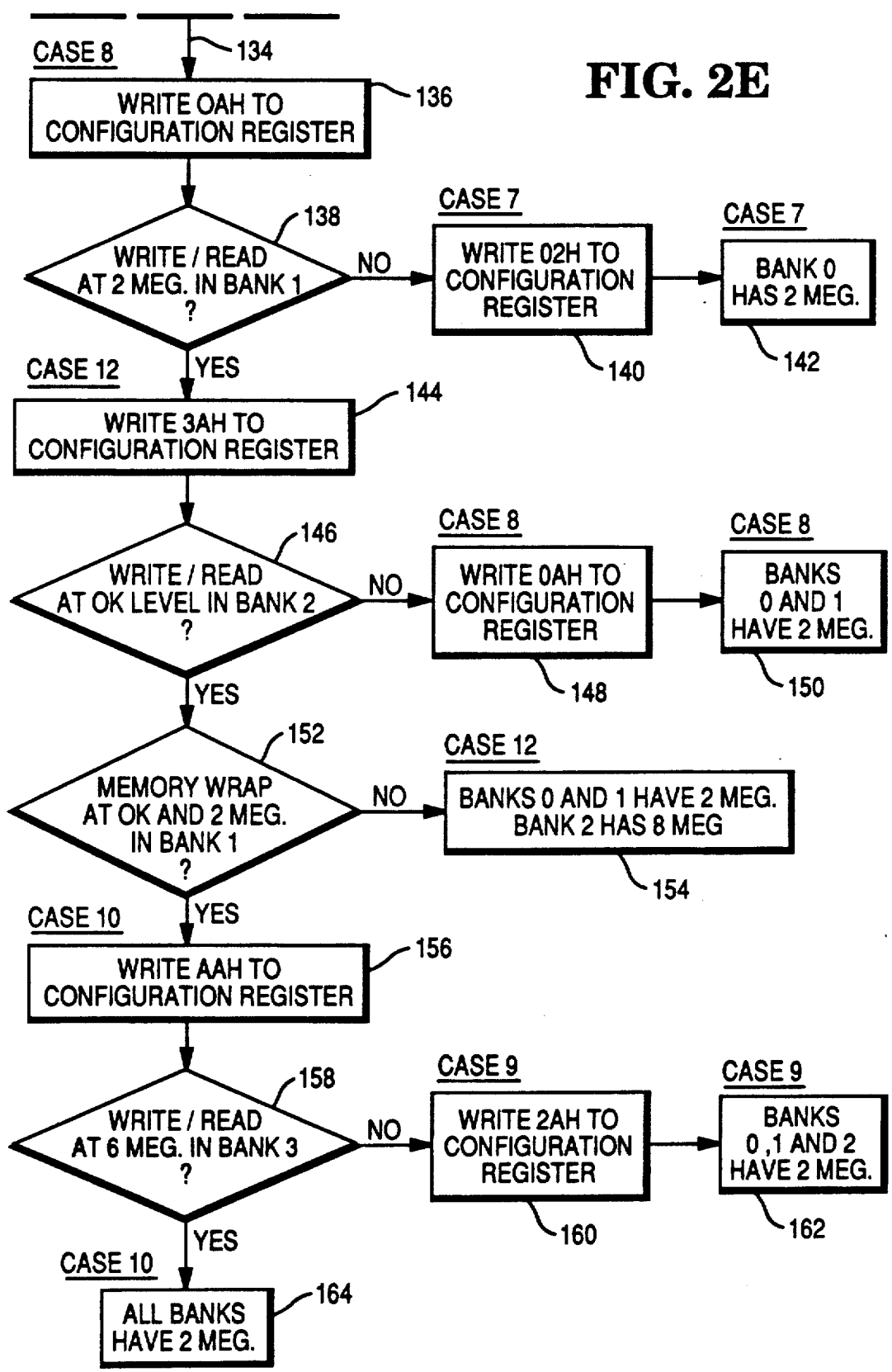

Referring now to FIG. 1, there is shown a block diagram of the apparatus utilized in automatically sizing the memory banks contained in the computer system which determines what memory banks are present and what is their memory capacity. Included in the apparatus is a central processing unit (CPU) 20 in which is located a ROM memory unit 22 in which is stored the program for automatically sizing the memory banks upon power being applied to the computer system. The CPU 20 is coupled over an eight bit bus 24 to a configuration register 28 in which is stored during the operation of the program one of the memory configuration coded words listed in the second column of Table 1 (FIG. 4). When attempting to determine the size of the memory banks during the operation of the program, the CPU 20 will write an eight bit data word representing one of the coded words listed as "memory configuration" in column 2 of Table 1 (FIG. 4) to the configuration register 28 for storage therein enabling the register to output this same coded word over bus 30 to a memory decode unit 32 which decodes the coded word and outputs a fifteen bit word representing the Case No. listed in column 1 of Table 1 associated with the selected coded word over bus 34 to a bank select unit 36. Table 1 (FIG. 4) is a truth table of the logical operation of the memory decode unit 32 which, in response to receiving from the CPU 20 one of the coded words listed in the second column represented by the eight configuration bits listed in the last four columns of the table, will output over bus 34 the fifteen bit word indicating the selected memory configuration. The coded words listed in the second column of Table 1 represent the corresponding memory configuration and maximum capacity of the banks listed in the third column of the table. A case number listed in the first column has been assigned for an associated memory configuration. Thus, for example, if it were found that the memory consisted only of banks 0, 1 and 2 and each had a memory capacity of 512K, the memory configuration coded word 15H representing Case 3 would have been stored in the configuration register 28 utilizing the write enable signal appearing on line 26 and outputted by the CPU 20.

The fifteen bit data word inputted into the bank select unit 36 over bus 34 enables the bank select unit to determine which memory bank or banks are represented by the data bits appearing on the bus 30. Referring to FIG. 5, there is shown a truth table (Table 2) showing the 16 possible legal memory bank configurations that are available to the computing system of the present invention. While in the present example, the maximum size of a memory bank that is allowed is 8 megabytes, it is obvious that the maximum storage of the banks can be larger or smaller. The first column of Table 2 contains the case numbers corresponding to the case numbers found in Table 1 (FIG. 4) while the second column indicates the maximum memory size of each configuration. The last four columns in Table 2 represent how the addresses are decoded to designate the particular memory module or bank using the upper five bits of the address appearing on bus 38 (FIG. 1) and outputted from the CPU 20.

Various bits of the fifteen bit word are active depending on the decoding of the configuration. In many cases only one bit may be active at a time, but if several banks of memory contain the same size configuration, more than one bit may be active. These bits appearing on bus 34 activate logic within the bank select unit 36 which decodes the last five address bits appearing on bus 38, which five address bit are outputted from the CPU 20 to select the memory bank that is to be accessed in a manner that is well known in the art. The bank select unit 36 will output a four bit word representing the address of the bank to be accessed over the four bit bus 40 to a DRAM signal generator unit 42 which outputs over bus 44 to the DRAM memory unit 46, a twenty bit word comprising the proper timing signals to interface with the selected DRAM banks located in the memory unit 46.

Figure 6B:
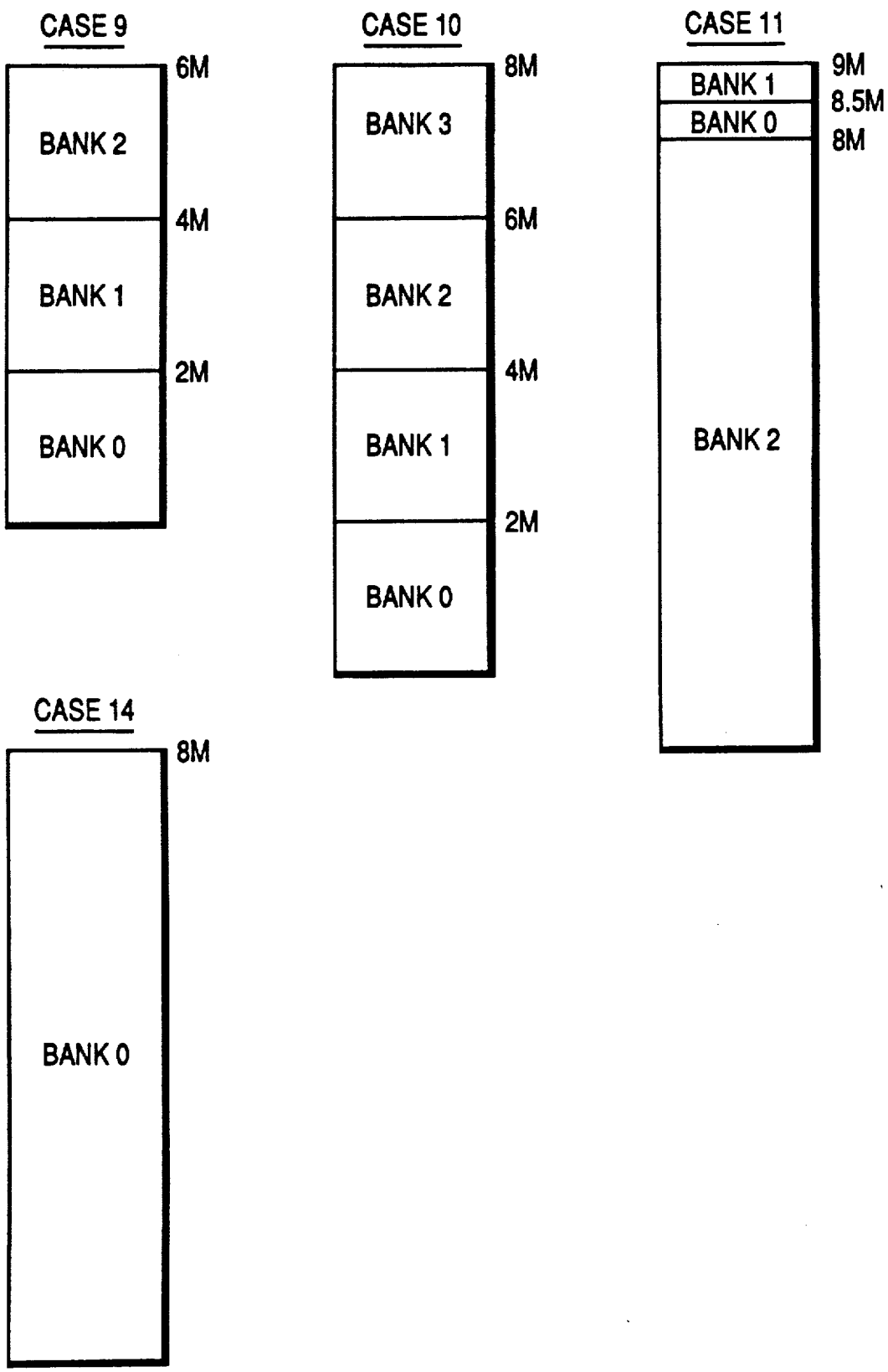
Figure 6C:
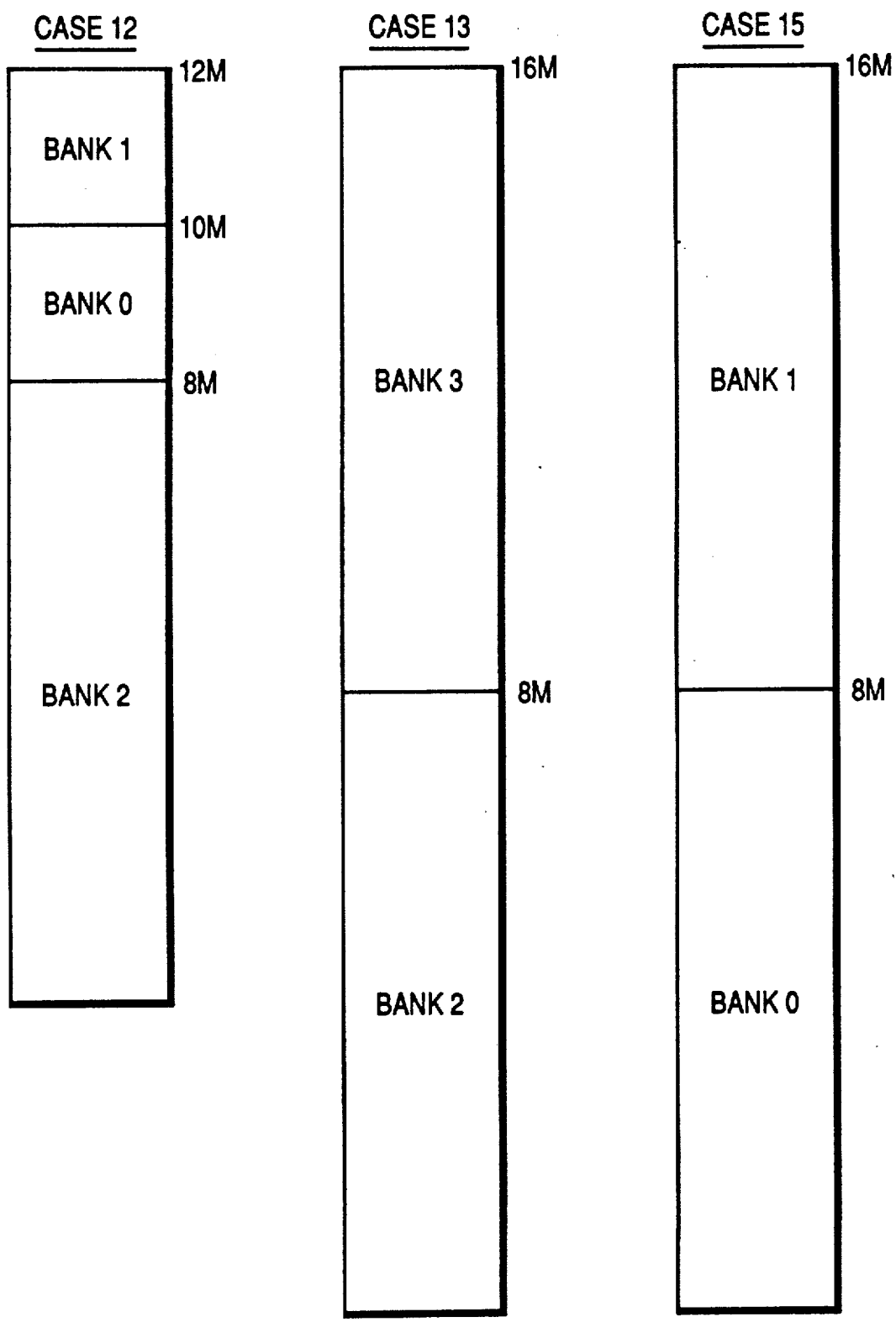

The present computing system may include four memory banks which may be arranged in the manner shown in FIGS. 6A-6C inclusive. Each of the memory configurations set out in the third column of Table 1 (FIG. 4) are illustrated. For example, case 6 (FIG. 6A) shows that banks 2 and 3 have a maximum capacity of 2 megabytes each, while banks 0 and 1 have a maximum capacity of 512 kilobytes. The banks are arranged so that the higher capacity banks are accessed first since these banks contain the lowest addresses. In determining the capacity that banks 2 and 3 have the largest capacities, the present invention will first write a first word at the lowest address in the bank and then perform a read operation at the same address. If the first word is read indicating the presence of memory in the bank, the program will then perform a memory wrap operation to determine the size of memory in the bank. A memory wrap operation consists of writing a second word at one address in the memory bank and perform a read operation at the lowest address in the memory. If the word read is the second word, the size of the memory is equal to the capacity represented by the one address. If not, the memory is limited to a previously found bank size as will be described more fully hereinafter.

Included in the timing signals transmitted over bus 44 to the memory unit 46 are 11 multiplex address signals, 6 CAS and 3 RAS signals. These signals determine which memory bank is being addressed and which addresses are being accessed within that bank.

Referring now to FIGS. 2A-2E inclusive, there is shown a flowchart of the memory sizing operation of the present invention. The CPU 20 will start (block 60) by writing the binary digits 00 to the configuration register 28 (block 62) to determine if there is an external memory associated with the computing system (block 64). If there is, the program will end (block 66). If there is no external memory in the computer system, the processing unit 20, using the write enable signal appearing on line 26 (FIG. 1) will write the memory configuration coded word FOH to the configuration register (block 68) enabling the bank select unit 36 (FIG. 1) to select memory banks 2 and 3 (FIG. 4) to be accessed. It will be seen from Table 1 that the coded word FOH represents case 13 (FIG. 6C) which has a memory capacity of 16 megabytes (FIG. 5) in which banks 2 and 3 have a memory capacity of 8 megabytes each. This is the largest memory configuration allowed (Table 2) in the system being described herein. The processing unit 20 will write a binary word, for example, over bus 52 (FIG. 1) such as the hexadecimal word 55 at the 8 Meg. address in bank 3 and then read over bus 52 the data appearing at the same address (block 70). If the data read is not the same as that which was written indicating the system does not have an 8 Meg. memory in bank 3, the processing unit will then write the next lower configuration word 03H to the configuration register 28 (block 76) representing Case 14 (FIG. 6b).

If the processing unit reads the same data in bank 3 that was written at the 8 Meg. address indicating that bank 3 has memory therein, the processing unit will perform a memory wrap operation above 8 Meg. (block 72) to detect the size of the memory in bank 3 which may consist of writing a binary word at the 10 Meg. address in bank 3 and then reading out the same binary word at the 8 Meg. address. If the processing unit can read the same data that was written, the processing unit 20 will write the next lower memory configuration bits 03H over the bus 24 to the configuration register 28 (FIG. 1) (block 76).

If the processing unit cannot successfully perform a memory wrap operation (block 72), the program will end with the configuration word FOH stored in the configuration register 28 indicating that banks 2 and 3 are present in the memory and that each has 8 Meg memory capacity (block 74).

After writing the configuration word 03H (Table 1) to the configurations register 28 (Block 76) representing case 14 (FIGS. 4, 5 and 6B), the processing unit 20 will attempt a memory wrap operation at the lowest address (block 78 ) (FIG. 2B) in bank 0. If the processing unit can perform a memory wrap between 0K and 512K indicating that bank 0 has a memory capacity of 512K, the processing unit 20 will write the configuration word 05H to the register 28 (block 80) representing Case 2 (FIG. 6A) and write and read a binary word to the 512K address in bank 1 (block 82). If the processing unit 20 cannot write and read a binary word at that position indicating that bank 1 is not present, the processing unit will write the configuration bits 01H in the configuration register 28 (block 84) representing Case 1 (FIG. 6A) indicating that the memory consists of bank 0 and has 512K of available memory (block 86).

If the processing unit can write and read the same data at the 512K address in bank 1 (block 82) indicating that bank 1 has 512K memory capacity, the processing unit will write the memory configuration word 35H to the configuration register (block 88)(FIG. 2C) representing Case 11 (FIG. 6B) to detect if bank 2 has any memory capacity and will write and read a binary word at address 0K in bank 2 (block 90). If the processing unit cannot read and write at such an address indicating that bank 2 is not present, the processing unit will write the memory configuration word 05H (block 92) representing Case 2 (FIG. 6A) in the configuration register 28 indicating that the memory consists of banks 0 and 1 with each having a memory capacity of 512K (Block 94).

If the processing unit can address a memory location at address 0K in bank 2, the processing unit will perform a memory wrap between the 0K and the 512K locations in bank 2 (block 96). If the processing unit can perform such a memory wrap, the processing unit will write the memory configuration word 55H to the configuration register 28 (block 98)(FIG. 2D) representing Case 4 (FIG. 6A) and perform a read and write operation at the 1.5 Meg. location in bank 3 (block 100). If the processing unit cannot perform such an addressing operation, the processing unit will output the configuration word 15H to the configuration register 28 (block 102) representing Case 3 (FIG. 6A) indicating that banks 0, 1 and 2 each has a memory capacity of 512K (Block 104). If the processing unit can write and read at such an address, all of the banks have 512K memory (block 106) and the configuration word 55H will remain stored in the configuration register 28 (block 98).

If the processing unit cannot perform a memory wrap between the 0K and 512K locations in bank 2 (Block 96)(FIG. 2C), the processing unit will perform a memory wrap between the 0K and 2 Meg. locations in bank 2 (block 108) to detect the size of the memory in the bank. If the processing unit cannot perform such a memory wrap operation, it will indicate that the memory configuration is represented by the configuration word 35H (block 88) and that the memory banks 0 and 1 have 512K memory capacity and that bank has 8 Meg. memory capacity (block 110). If the processing unit can perform a memory wrap at the 0K and 2 Meg. locations, the processing unit will write the configuration word A5H representing Case 6 (FIG. 6A) in the configuration register (block 112)(FIG. 2D) and will perform a write and read operation at the 2 Meg. address in bank 3 (block 114). If a write and read operation cannot be performed indicating that bank 3 has no memory, the processing unit will write the configuration word 25H to the configuration register (block 118) representing Case 5 (FIG. 6A) as the configuration of the memory and indicating that memory banks 0 and 1 have a 512K capacity while memory bank 2 has a 2 Meg. memory capacity (block 120). If memory bank 3 can be addressed at the 2 Meg. location, it will indicate that the memory banks 0 and 1 have 512K memory capacity and banks 2 and 3 have 2 Meg. memory capacity (block 116) as represented by the configuration word A5H (block 112).

If the processing unit cannot perform a memory wrap at the 512K location in bank 0 (block 78)(FIG. 2B), the processing unit will attempt a memory wrap operation at the 0K and 2 Meg. locations in memory bank 0 (block 122). If the processing unit cannot perform a memory wrap, it will write the configuration word 0FH to the configuration register 28 (block 124) representing Case 15 (FIG. 6C) indicating that the memory comprises only banks 0 and 1 each having a capacity of 8 Megs.

and then perform a write and read operation at the 8 Meg. location in memory bank 1 (block 126). If it cannot perform such an operation, it will write the next lowest configuration word 03H (Table 1) representing Case 14 (FIG. 6 B) to the register 28 (block 128) indicating that the memory comprises only bank 0 and has 8 Meg. memory capacity (block 130). If it can perform such an access operation, it will indicate that the memory includes banks 0 and 1 and each has a 8 Meg. memory capacity (block 132).

If the processing unit can perform a memory wrap at the 0K and 2 meg locations in memory bank 0 (block 122), the processing unit will proceed over line 134 and write the configuration word 0AH representing Case 8 (FIG. 6A) to the register 28 (block 136)(FIG. 2E) and write and read at the 2 Meg. address in memory bank 1 (block 138). If the processing unit 20 cannot perform such an access operation, it will write the configuration word 02H representing Case 7 (FIG. 6A) to the register 28 indicating that the memory comprises only bank 0 which has a 2 Meg. memory capacity (block 142). If the processing unit can perform such an operation at the 2 Meg. address indicating the presence of memory in bank 1, the processing unit will write the configuration word 3AH representing Case 12 (FIG. 6C) to the register 28 (block 144) which includes the bank configuration of Case 8 (0AH) together with bank 2 (Table 2) and then perform a write/read operation at address 0K in bank 2 (block 146).

If the processing unit cannot address memory bank 2 at such a level, it will write the configuration word 0AH representing Case 8 (FIG. 6A) to the configuration register 28 (block 148) indicating that banks 0 and 1 have 2 Meg. memory capacity (block 150). If the processing unit can write and read at address 0K in memory bank 2, the processing unit will perform a memory wrap operation at the 0K and 2 Meg. locations in bank 1 (Block 152). If the processing unit cannot perform such an operation, it will indicate that memory banks 0 and 1 have a 2 Meg. memory capacity and bank 2 has a 8 Meg. memory capacity (block 154). If the processing unit can perform such a memory wrap, it will write the configuration word AAH representing Case 10 (FIG. 6B) to the register 28 (block 156) and attempt to perform a write and read operation at the 6 Meg. address in bank 3 (block 158). If the processing unit can perform such an access operation, it will indicate (block 164) that all four memory banks have 2 Meg. memory capacity. If the processing unit cannot address memory bank 3 at such a location, it will write the configuration word 2AH to the register 28 (block 160) representing Case 9 (FIG. 6B) indicating that memory comprises banks 0, 1 and 2 each with each having a 2 Megs memory capacity (block 162).

It will be seen that the present invention provides a relatively simple procedure for automatically determining the number of banks and their memory capacity that are present in a computer system. By assuming a predetermined memory configuration and applying a two step test procedure to the assumed memory banks, the present invention automatically detects the the size of the memory.

Although the preferred embodiment of the present invention has been described herein, it is not intended that the invention be restricted thereto but that it be limited only by the true spirit and scope of the appended claims.

What is claimed is:

1. In an apparatus which includes a central processing unit and a memory unit having banks of variable memory capacities, a method for automatically detecting the size of the memory unit upon power being applied to the apparatus comprising the steps of:

storing data representing a plurality of memory units each with different storage capacities in a first storage unit;

selecting from the first storage unit a first and second memory unit as the size of the memory unit;

writing a first binary word at the lowest address in the memory unit having the largest storage capacity;

performing a first read operation at said lowest address;

writing a second binary word at an address that is higher than said lowest address in response to reading the first binary word at said lowest address in the memory unit;

performing a second read operation at said lowest address in the memory unit;

selecting from the first storage unit as the size of the memory unit a third memory unit having a first memory capacity when the second binary word is read by the second read operation;

writing a third binary word at an address which is higher than the lowest address i the third memory unit;

performing a third read operation at the lowest address in the third memory unit;

selecting from the first storage unit as the size of the memory unit the third memory unit having a second memory capacity which is less than the first memory capacity and a fourth memory unit having a third memory capacity when the third binary word is read by said third read operation;

writing a fourth binary word at the lowest address in the third memory unit;

performing a fourth read operation at the lowest address in the third memory unit;

storing in a second storage unit the data representing the first and second memory units as representing the memory capacity of the memory unit when the second binary word is not read by the second read operation; and storing data in the second storage unit representing the third memory unit having the second memory capacity as the storage capacity of the memory unit when the fourth binary word is not read by the fourth read operation.

2. The method of claim 1 which further includes the steps of;

writing a fifth binary word at a first address which is higher than the lowest address in the second memory unit;

performing a third read operation at the lowest address in the third memory unit;

writing a sixth binary word at a second address in the third memory unit which is higher than the first address when the fifth binary word is not read by said third read operation;

performing a fourth read operation at the lowest address in the third memory unit;

selecting from the first storage unit as the size of the memory unit the third memory unit having said first storage capacity and the fourth memory unit having a second storage capacity which is greater than the first memory capacity when the sixth binary word is not read by the fourth read operation;

writing a seventh binary word at the lowest address in the fourth memory unit;

performing a fifth read operation at the lowest address in the fourth memory unit; and storing in the second storage unit the data representing the third and fourth memory units as the capacity of the memory unit when the seventh binary word is read at the lowest address in the fourth memory unit.

3. The method of claim 2 which further includes the steps of selecting from the first storage unit as the size of the memory unit data representing the third memory unit having said first memory capacity and storing the data representing the third memory unit in the second storage unit as representing the memory of the memory unit when the seventh binary word is not read at the lowest address in the third memory unit.

4. The method of claim 1 which further includes the steps of;

selecting from the first storage unit as the size of the memory unit the third memory unit having said second storage capacity, the fourth memory unit having said first memory capacity and a fifth memory unit having a first memory capacity when the fourth binary word is read by said fourth read operation;

writing a fifth binary word at the lowest address in the fifth memory unit;

performing a fifth read operation at the lowest address in the fifth memory unit; and selecting from the first storage unit for storage in the second storage unit the third memory unit having said second storage capacity and the fourth memory unit having said first memory capacity as representing the storage capacity of the memory unit when the fifth binary word is not read by the fifth read operation.

5. The method of claim 4 which further includes the steps of;

writing a sixth binary word at an address which is higher than the lowest address in the fifth memory unit in response to reading the fifth binary word at said lowest address;

performing a sixth read operation at said lowest address in said fifth memory unit;

writing a seventh binary word at an address in the fifth memory unit which is higher than the address at which the sixth binary was written;

performing a seventh read operation at said lowest address in said fifth memory unit; and storing in the second storage unit data representing said third, fourth and fifth memory units comprising the memory unit when the seventh binary word is not read by the seventh read operation.

* * * * *